United States Patent [19]

Dörr et al.

[11] Patent Number: 5,030,428
[45] Date of Patent: Jul. 9, 1991

[54] PROCESS OF PURIFYING FLUE GASES

[75] Inventors: Karl-Heinz Dörr, Mainz; Hugo Grimm, Miltenberg am Main; Heinz Enumann, Bad König; Jürgen Adlkofer, Grünstadt, all of Fed. Rep. of Germany

[73] Assignees: Metallgesellschaft AG, Frankfurt am Main; BASF AG, Ludwigshafen, both of Fed. Rep. of Germany

[21] Appl. No.: 325,595

[22] Filed: Mar. 20, 1989

[30] Foreign Application Priority Data

Mar. 26, 1988 [DE] Fed. Rep. of Germany ....... 3810337

[51] Int. Cl.⁵ .................... B01D 53/34; B01D 53/36; C01B 17/88; C01B 17/90
[52] U.S. Cl. .................... 423/215.5; 423/242; 423/244; 423/522; 423/531
[58] Field of Search .............. 423/210, 215.5, 240 R, 423/240 S, 242 R, 242 A, 244 R, 244 A, 522, 531; 55/85, 89

[56] References Cited

U.S. PATENT DOCUMENTS

| | | | |
|---|---|---|---|
| 2,028,318 | 1/1936 | Carter | 423/242 R |
| 3,953,578 | 4/1976 | Thirion | 423/522 |
| 4,368,183 | 1/1983 | Dörr et al. | 423/522 |
| 4,842,835 | 6/1989 | Dörr et al. | 423/242 |
| 4,910,011 | 3/1990 | Dörr et al. | 423/240 |

FOREIGN PATENT DOCUMENTS 277559  8/1988  European Pat. Off. ............ 423/240

OTHER PUBLICATIONS

Hackh's Chemical Dictionary, 4th Ed. Grant ed. McGraw-Hill Book Co. 1972, p. 648.

*Primary Examiner*—Jeffrey E. Russel
*Attorney, Agent, or Firm*—Sprung Horn Kramer & Woods

[57] ABSTRACT

In flue gases or other humid exhaust gases which contain $NO_x$ and $SO_2$, the $NO_x$ content is reduced and the $SO_2$ content is oxidized to $SO_3$ by a catalytic processing and the $SO_3$ content is subsequently condensed as sulfuric acid. In order to prevent a clogging and deterioration of the catalyst and a contamination of the sulfuric acid the flue gas is subjected before the catalytic processing to a fine dedusting by a scrubbing with hot dilute sulfuric acid. In dependence on the water content of the flue gases the concentration of sulfuric acid in the dilute sulfuric acid and the temperature of the latter are adjusted so that no water will be transferred from the flue gases to the dilute sulfuric acid and no water or only a small amount of water will be transferred from the dilute sulfuric acid to the flue gas.

12 Claims, 1 Drawing Sheet

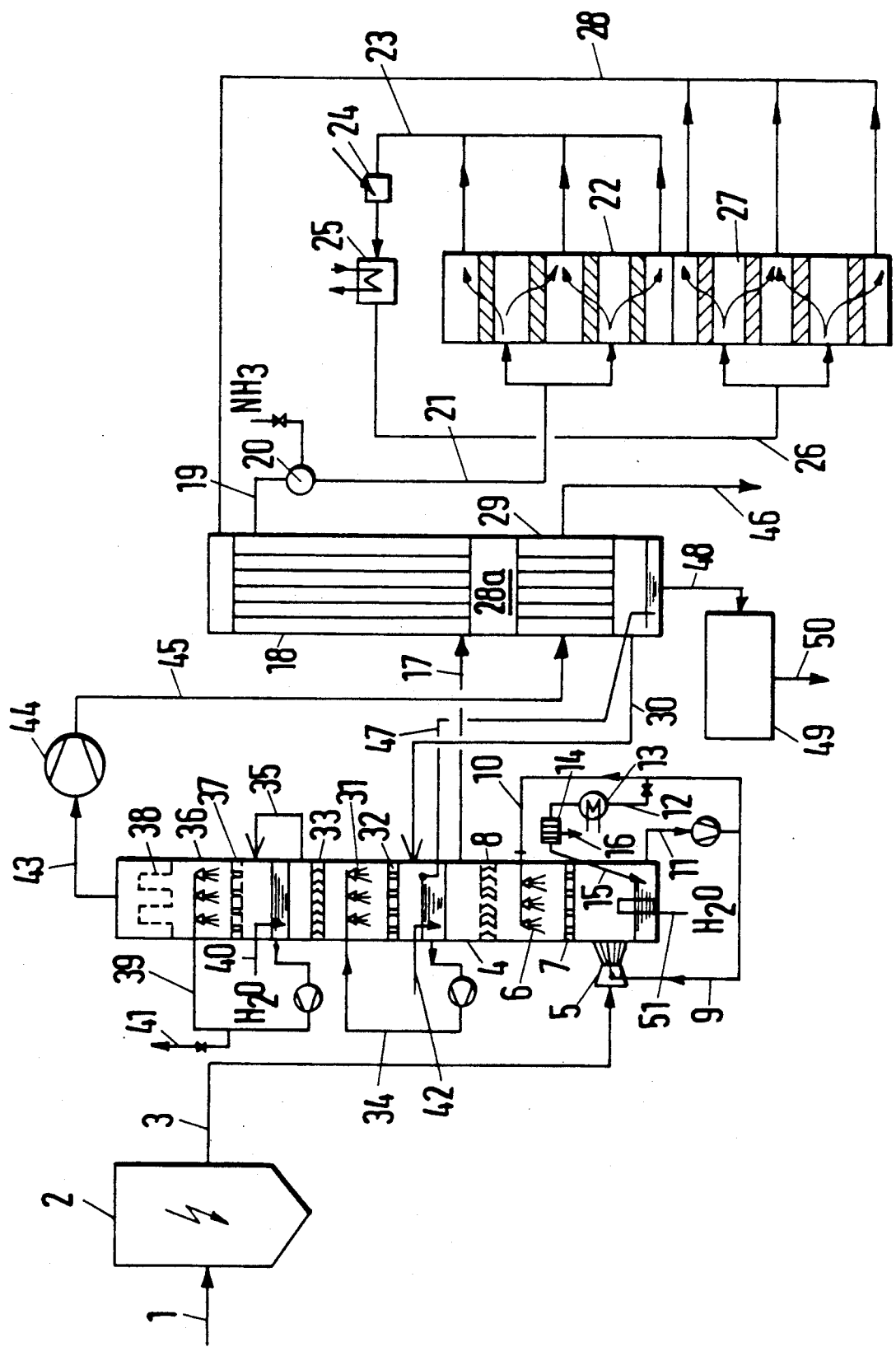

PROCESS OF PURIFYING FLUE GASES

BACKGROUND OF THE INVENTION

This invention relates to a process of purifying flue gases or other humid exhaust gases, which contain $NO_x$ and $SO_2$, wherein the $NO_x$ content is reduced and the $SO_2$ content is oxidized to $SO_3$ by a catalytic processing and the $SO_3$ content is subsequently condensed as sulfuric acid.

The pollutants contained in flue gases from fuel-firing furnaces mainly consist of $NO_x$, $SO_2$, HCl and HF. For instance, the combustion of coal which contains 1% by weight sulfur in large fuel-firing plants will result in a flue gas which contains 6% by volume oxygen and contains per $sm^3$, e.g., 1900 to 2000 mg $SO_2$, less than 150 mg HCl and less than 50 mg HF.

In dependence on the fuel-firing process and on the coal which is combusted the $NO_x$ contents may range from less than 600 $mg/sm^3$ to more than 2000 $mg/sm^3$.

It is known that the emission of such pollutants can be decreased in that the flue gas is subjected to a catalytic aftertreatment in which the $NO_x$ is reduced with $NH_3$ to $N_2$ and the $SO_2$ is oxidised to $SO_3$. The humid gas is subsequently cooled below the dew point temperature of sulfuric acid and $SO_3$ is condensed as sulfuric acid.

Such a process is known from Published German Application 33 31 545. The $SO_2$-containing hot flue gas is dedusted in an electrostatic precipitator and is then cooled to the temperature which is required for the catalysis. Thereafter the $SO_2$ is catalytically reacted with oxygen to $SO_3$. The $SO_3$-containing humid gas is cooled in a first stage of an air preheater to a temperature above the dew point temperature of sulfuric acid and is subsequently cooled in a second stage to a temperature which is below the dew point temperature of sulfuric acid and at which the flue gas may be admitted to the chimney. The second stage of the air preheater is made of acid-resisting material, such as glass tubes.

In the process described in U.S. Pat. No. 4,164,546 the hot flue gases are suitably cooled in an economizer or air preheater and are then catalytically treated with an addition of ammonia. The oxidation catalyst may consist of a catalyst based on $V_2O_5$ and $K_2O$. The $SO_3$ which has been formed is separated in known manner.

In the process described in Published German Application 36 01 378 the flue gases are first catalytically treated with an addition of ammonia to reduce the $NO_x$ and $SO_2$ is then catalytically reacted with oxygen to form $SO_3$. After the catalytic processing an interstage cooling with water is effected and the $SO_3$ is reacted to form sulfuric acid. The purified gas is fed to the chimney. The flue gases are dedusted in an electrostatic precipitator at an elevated temperature before the catalysis or in a dust filter after the catalysis.

Although the flue gases are dedusted in said processes, they still contain residual dust, which may clog or deteriorate the catalyst and may introduce impurities into the condensed sulfuric acid.

SUMMARY OF THE INVENTION

It is an object of the invention to avoid in a simple and economical manner a clogging and deterioration of the catalyst and a contamination of the sulfuric acid and to achieve this in a manner which is as simple and economical as possible.

That object is accomplished in accordance with the invention in that before the catalytic processing the flue gases are subjected to a fine dedusting by being scrubbed with hot dilute sulfuric acid, the concentration and temperature of which are so adjusted in dependence on the water content of the flue gases that a transfer of water from the flue gases to the dilute sulfuric acid is prevented and no water or only a small amount of water will be transferred from the dilute sulfuric acid to the flue gas, and the dilute sulfuric acid is recirculated.

The concentration and temperature of the dilute sulfuric acid are so selected that the water vapor partial pressure of the dilute sulfuric acid is as high as or somewhat higher than the water vapor partial pressure of the gas. As a result, a decrease of the concentration of the sulfuric acid by an absorption of water from the gas will be prevented so that it is not necessary to withdraw a part of the sulfuric acid and to replace it by more highly concentrated sulfuric acid in order to maintain a constant concentration. If a small quantity of water is transferred from the dilute sulfuric acid into the gas, no water will be transferred from the gas to the sulfuric acid in case of fluctuations involving in a higher water content of the gas. The quantity of water which is permitted to be transferred from the dilute sulfuric acid to the gas will depend on the operating conditions of the subsequent processing of the flue gas. Any water which has been transferred from the sulfuric acid to the gas will be replaced. For instance, if a flue gas at 170° C. contains 50 $g/sm^3$ water and the scrubbed gas is required to contain about 55 $g/sm^3$ water and to have a temperature of 150° C., the dilute sulfuric acid must have a concentration of about 85% by weight because such sulfuric acid will have a water vapor partial pressure of about 55 mm Hg at 150° C. This corresponds to a water content of approximately 55 $g/sm^3$. If the scrubbed gas is to have an exit temperature of 170° C., the dilute sulfuric acid will be required to have a concentration of about 87.5% by weight. If the scrubbed gas is required to contain 50 $g/sm^3$ water, the concentration must be about 85.5% by weight at 150° C. and about 89% by weight at 170° C. Scrubbing may be effected in a venturi tube, in a tower provided with a bed of packing or with a nozzle plate, in a combination of a venturi tube and a tower or in different scrubbers. The dilute sulfuric acid is injected or sprayed and is collected in a sump and recirculated from the latter. The gas outlet of the scrubber is preceded by a mist seperator.

In accordance with a preferred feature, the dilute sulfuric acid contains sulfuric acid in a concentration of 70 to 90% by weight, preferably 82 to 88% by weight. This will produce particularly good results in operation.

In accordance with a preferred feature, the dilute sulfuric acid is at a temperature from 100° to 200° C., preferably 130° to 180° C., as it enters the scrubber. This will produce particularly good results in operation.

In accordance with a preferred feature, the scrubbing with the dilute sulfuric acid is effected in a first stage in a cocurrent operation by an injection into a venturi tube and is effected in a second stage in a countercurrent operation in which the acid is sprayed onto a bed of packing or onto a venturi plate in a tower. The venturi scrubber may be vertical and may have at its bottom a separate sump and above the sump may communicate with the tower. Alternatively, the venturi scrubber may be horizontal and its outlet opening may directly open into the tower above the sump. The combination of the cocurrent scrubbing in the venturi scrubber and the subsequent countercurrent scrubbing in the tower will result in a particularly effective scrubbing involving only a low pressure drop.

In accordance with a preferred feature, a partial stream of the dilute sulfuric acid is freed from solids and is subsequently recycled to the scrubber. The removal of the solids from the partial stream may be preceded by a cooling and is effected in the usual manner by filters. Sulfuric acid which is lost by adhering to the filter cake will be replaced by fresh sulfuric acid. The solids which have been removed by scrubbing can thus be removed from the dilute sulfuric acid in a simple manner.

The scrubbed gas is subsequently subjected to a catalytic afterprocessing, in which $NO_x$ is reacted with added ammonia to form nitrogen first and the $SO_2$ is then also catalytically reacted to $SO_3$. Because the catalytic reduction of $NO_x$ is usually effected at temperatures of 200° to 500° C., preferably of 250° to 400° C., and catalysts consisting of titanium dioxide with catalytically active amounts of oxides of vanadium, molybdenum and/or tungsten are used, it may be necessary to heat the gas which has left the scrubber and which has a temperature not in excess of 200° C. The gases from which $NO_x$ has been removed in the first stage are then supplied to a second stage, in which $SO_2$ is catalytically oxidized to $SO_3$. The oxidation of $SO_2$ to $SO_3$ may be effected by the catalysts which are known for that purpose. But the known catalysts which contain $V_2O_5$ are preferred to noble metal catalysts because the former are less susceptible to being poisoned. Because said catalysts have an operating temperature of 380° to 500° C., preferably of 400° to 450° C., it may be necessary to heat the gases which have left the $NO_x$ stage to such operating temperature.

In accordance with a preferred feature, the gas which has left the scrubber is heated in an indirect heat exchanger by the catalyzed gas which has left the $SO_2$ oxidation stage to the operating temperature of the catalyst for the reduction of $NO_x$. In that case part of the heat content of the catalysed gases from the stage of $SO_2$ oxidation will be used for the process in a favourable manner.

In accordance with a preferred feature, after the reduction of $NO_x$ the gas is heated to the operating temperature of the catalyst for the oxidation of $SO_2$. In this case both stages of the catalysis can be performed in an optimum manner.

In accordance with a preferred feature, the gas is heated by an indirect heat exchange to the operating temperature of the catalyst for the oxidation of $SO_2$. Contrary to a direct heat exchange effected by an admixing of hot combustion gases, that step will not increase the gas volume and will not contaminate the gas.

In accordance with a preferred feature, the catalytic processing of the flue gases is effected in horizontal contacting trays with bulk catalysts. The mass of the catalyst is preferably arranged in a plurality of contacting trays, which are connected in parallel, and a partial stream of gas is passed through each contacting tray. In that case the contacting trays may be small in diameter.

The $SO_3$-containing gases which have left the second catalyst stage are suitably cooled first only to a temperature above the dew point temperature of the sulfuric acid by an indirect heat exchange with the gases coming from the fine scrubber, which will be described hereinafter, whereas the temperature is decreased in a further stage in another indirect heat exchanger to a temperature below the dew point temperature of the sulfuric acid.

The gas which has thus been cooled is fed to an $SO_3$ condenser, in which the residual sulfuric acid vapor is condensed by injected dilute sulfuric acid and a sulfuric acid having a predetermined concentration is produced. The gas which has left the $SO_3$ condenser is scrubbed in a fine scrubber with an injected aqueous liquid and is thus cooled to 40° to 60° C. The purified gas is heated to the entrance temperature for the chimney.

That second indirect heat exchanger, in which the catalyzed gas is cooled below the dew point temperature of the sulfuric aicd, is resistant to corrosion and consists, e.g., of a tubular heat exchanger comprising glass tubes, plastic-coated or enamelled tubes or graphite tubes. The exit temperature of the gas is adjusted to about 120° to 140° C. The sulfuric acid which has been condensed in the heat exchanger may be combined with the condensed sulfuric acid in the sump of the $SO_3$ condenser or vice versa or the two sumps may be separately withdrawn.

The $SO_3$ condenser may consist of a tower which contains a bed of packing or of a tower which contains one or more nozzle plates, on which the dilute sulfuric acid is sprayed. The dilute sulfuric acid may be injected or sprayed. The gas outlet of the $SO_3$ condenser may be preceded by a mist separator. The dilute sulfuric acid is collected in a sump at the bottom. A vertical or horizontal venturi may be connected between the second indirect heat exchanger and the $SO_3$ condenser and may be used for an additional processing of the gas with injected dilute sulfuric acid. The dilute sulfuric acid is recirculated. The temperature to which the gas is cooled in the $SO_3$ condenser will depend on the partial pressure of the mixture components $H_2O$ and $H_2SO_4$. The concentration of the condensed dilute sulfuric acid is suitably selected in the range from 60 to 90% by weight. That value will determine the temperature which is required for the dilute sulfuric acid which is injected into the $SO_3$ condenser because the concentration of the dilute sulfuric acid which becomes available will depend on the temperature of the gas leaving the $SO_3$ condenser. That exit temperature will depend on the temperature at which the dilute sulfuric acid enters the $SO_3$ condenser. The succeeding fine scrubber may be designed like the $SO_3$ condenser or may consist of a venturi in which a fine scrubbing is effected in a cocurrent operation. The scrubber may be mounted on top of the $SO_3$ condenser or may be separately installed. In both cases the liquid circuits do not communicate with each other. The aqueous liquid may consist of water or of highly diluted sulfuric acid having a concentration up to about 20% by weight or any other liquid for absorbing HCl and HF. The aqueous liquid is suitably recirculated and the water which has been taken up by the gas is replaced. The pollutants which have been absorbed in the scrubber may continuously be removed from a partial current which has been branched off or may be removed discontinuously, e.g., by a neutralization. The gas outlet of the scrubber may be preceded by a filter, which may consist of a plug filter or a wire mesh filter or a multiblade filter or of a filter containing a bed of bulk filter material. The aqueous liquid which is injected into the fine scrubber may contain $H_2O_2$ or $H_2S_2O_8$ so that residual $SO_2$ will also be oxidized to $SO_3$, which will be absorbed. In that case, fluctuations in the catalytic reaction of $SO_2$ to $SO_3$ or a failure of the catalyst may be allowed for and the $NO_x$ content will be decreased.

In accordance with a preferred feature the catalyzed gas which has been cooled in the indirect heat exchanger by the gas which has left the scrubber is cooled further in a second indirect heat exchanger to a temperature below the dew-point temperature of sulfuric acid by the purified exhaust gas and is then fed to an $SO_3$ condenser, the residual sulfuric acid vapor is absorbed by injected dilute sulfuric acid to form a sulfuric acid having a predetermined concentration, the gas which has left the $SO_3$ condenser is scrubbed in a fine scrubber with an injected aqueous liquid and is thus cooled to 40° to 60° C., and the purified gas is heated in the second indirect heat exchanger to the entrance temperature for the chimney.

In accordance with a preferred feature the concentration of the dilute sulfuric acid in the $SO_3$ condenser is 60 to 90% by weight and its temperature is 90° to 140° C. Particularly good operating conditions will be obtained in said ranges.

In accordance with a preferred feature the catalytic processing of the flue gases is effected in horizontal contacting trays with bulk catalysts. Preferably the bulk catalysts are arranged in a plurality of contacting trays which are connected in parallel and a partial stream of the gas is passed through each contacting tray. As a result the diameter of the contacting trays can be kept small. If a plurality of contacting trays are necessary in order to achieve the desired degree of conversion then these contacting trays are connected in series. In accordance with a preferred feature the purified gas is cooled to a temperature of 72° to 80° by an indirect heat exchange before entering the chimney. In many cases this temperature is sufficient for the admition to the chimney and a corresponding amount of heat can be recovered in a useful manner by the heat exchange.

The invention will be explained more in detail and by way of example with reference to the drawing and an example.

BRIEF DESCRIPTION OF THE DRAWING

The FIGURE is a schematic representation of a system for carrying out the process according to the invention.

DETAILED DESCRIPTION OF THE INVENTION

The flue gas arriving in line 1 is dedusted in an electrostatic precipitator 2 and is then supplied in line 3 to the scrubber 4. The scrubber 4 consists of the horizontal venturi tube 5 and of the tower 6, which contains a nozzle plate 7 and a mist separator 8. Dilute sulfuric acid from line 9 is injected into the venturi tube 5 and is sprayed from line 10 onto the nozzle plate 7. The dilute sulfuric acid which has been separated is withdrawn from the sump at the bottom of the scrubber through line 11 and is pumped back to the line 9 and 10. A partial stream of the dilute sulfuric acid is fed through line 12 and cooler 13 to a filter 14. The filtrate is recycled in line 15 to the scrubber 4. The solids are removed via 16. The sump of the scrubber 4 is fed via line 51 with water for replacing the water which has been absorbed therein. The scrubbed gas is fed in line 17 to the tubular heat exchanger 18 and is heated there and is then fed in line 19 to the mixer 20, in which $NH_3$ is admixed. The gas is subsequently fed in line 21 to the stage 22 for the reduction of $NO_x$ and is withdrawn from that stage via line 23. The gas from which $NO_x$ has been eliminated is then indirectly heated at 24 or is heated at 25 by an indirect heat exchange with steam and is subsequently fed in line 26 to the stage 27 for the catalytic oxidation of $SO_2$. The $SO_3$-containing gas is fed in line 28 to the tubular heat exchanger 18 and is cooled therein and is then fed through gas duct 28a to the tubular heat exchanger 29 and from the latter is fed in line 30 to the $SO_3$ condenser 31, which contains a nozzle plate 32 and a mist separator 33. Dilute sulfuric acid from the sump of the $SO_3$ condenser is recirculated via line 34 and is sprayed onto the nozzle plate. The gas from which $SO_3$ has substantially been removed is fed in line 35 to the fine scrubber 36, which contains a nozzle plate 37 and a plug filter 38. Scrubbing water from the sump of the scrubber 36 is recirculated via line 39 and is sprayed onto the nozzle plate 37. The water which has been taken up by the gas is replaced by water that is supplied via line 40 to the sump of the scrubber 36. A partial stream of the scrubbing liquid is branched from line 39 in line 41 and is fed to a stripper, which is not shown and in which HCl and HF are removed. Thereafter that partial stream is recycled in line 42 to the sump of the $SO_3$ condenser 31. The purified gas leaves the fine scrubber via line 43. After the fan 44 the gas is fed in line 45 to the tubular heat exchanger 29 and is heated therein and is subsequently fed in line 46 to the chimney. The dilute sulfuric acid which is collected in the $SO_3$ condenser 31 is fed in line 47 to the sump of the tubular heat exchanger 29. The dilute sulfuric acid which has been collected in the sump of the tubular heat exchanger 29 is fed in line 48 to the upgrader 49 and is strengthened there and is withdrawn as a product via line 50.

EXAMPLE

The values are related to the items indicated on the drawing.

| Line 3 | |
|---|---|
| Gas | 200.000 sm$^3$/h |
| Temperature | 170° C. |
| $SO_2$ | 2.000 mg/sm$^3$ |
| $NO_x$ | 800 mg/sm$^3$ |
| $SO_3$ | 50 mg/sm$^3$ |
| HCl | 150 mg/sm$^3$ |
| HF | 30 mg/sm$^3$ |
| $H_2O$ | 50 g/sm$^3$ |
| dust | 50 mg/sm$^3$ |
| Line 17 | |
| Gas | 200.000 sm$^3$/h |
| Temperature | 150° C. |
| $H_2O$ | 55 g/sm$^3$ |
| dust | 0 to traces |
| $SO_2$, $NO_x$, $SO_3$, HCl, HF as in line 3 | |
| Line 19 | |
| Gas | 200.000 sm$^3$/h |
| Temperature | 380° C. |
| $SO_2$, $NO_x$, $SO_3$, HCl, HF, $H_2O$ as in line 17 | |
| Line 23 | |
| Gas | 200.000 sm$^3$/h |
| Temperature | 380° C. |
| $NO_x$ | 100 mg/sm$^3$ (calculated as NO) |
| $SO_2$, $SO_3$, HCl, HF, $H_2O$ as in line 21 | |
| Line 26 | |
| Gas | 200,000 sm$^3$/h |
| Temperature | 420° C. |
| $SO_2$, $NO_x$, $SO_3$, HCl, HF, $H_2O$ as in line 23 | |
| Line 28 | |
| Gas | 200,000 sm$^3$/h |
| Temperature | 420° C. |
| $SO_2$ | 140 mg/sm$^3$ |
| $SO_3$ | 2.375 mg/sm$^3$ |
| $NO_x$, HCl, HF, $H_2O$ as in line 26 | |
| Gas duct 28a | |
| Gas | 200.000 sm$^3$/h |

-continued

| | |
|---|---|
| Temperature | 190° C. |
| $SO_2$, $SO_3$, $NO_x$, HCl, HF, $H_2O$ as in line 28 | |
| Line 30 | |
| Gas | 200,000 sm$^3$/h |
| Temperature | 130° C. |
| $SO_3$ | 1,420 mg/sm$^3$ |
| $SO_2$, $NO_x$, HCl, HF, $H_2O$ as in gas duct 28a | |
| Line 35 | |
| Gas | 200,000 sm$^3$/h |
| Temperature | 120° C. |
| $SO_3$ | 50 mg/sm$^3$ |
| $NO_x$, HCl, HF, $H_2O$ as in line 35 | |
| Line 43 | |
| Gas | 200,000 sm$^3$/h |
| Temperature | 50° C. |
| HCl | 50 mg/sm$^3$ |
| HF | traces |
| $H_2O$ | 100 g/sm$^3$ |
| $NO_x$ | 50 mg/sm$^3$ |
| Line 45 | |
| Gas | 200,000 sm$^3$/h |
| Temperature | 60° C. |
| $SO_2$, $SO_3$, $NO_x$, HCl, HF, $H_2O$ as in line 43 | |
| Line 46 | |
| Gas | 200,000 sm$^3$/h |
| Temperature | 120° C. |
| $SO_2$ | 140 mg/sm$^3$ |
| $NO_x$ | 100 mg/sm$^3$ (calculated as NO) |
| $SO_3$ | 50 mg/sm$^3$ |
| HCl | 50 mg/sm$^3$ |
| HF | traces |
| $H_2O$ | 100 g/sm$^3$ |
| Line 9 | |
| Acid | 200 m$^3$/h |
| Temperature | 150° C. |
| Concentration | 85% by weight $H_2SO_4$ |
| Line 10 | |
| Acid | 200 m$^3$/h |
| Temperature | 150° C. |
| Concentration | 85% by weight $H_2SO_4$ |
| Line 11 | |
| Acid | 410 m$^3$/h |
| Temperature | 150° C. |
| Concentration | 85% by weight $H_2SO_4$ |
| Line 12 | |
| Acid | 10 m$^3$/h |
| Temperature | 150° C. |
| Concentration | 85% by weight $H_2SO_4$ |
| Line 15 | |
| Acid | 10 m$^3$/h |
| Temperature | 40° C. |
| Concentration | 85% by weight $H_2SO_4$ |
| Line 34 | |
| Acid | 400 m$^3$/h |
| Temperature | 120° C. |
| Concentration | 77% by weight $H_2SO_4$ |
| Line 39 | |
| Acid | 400 m$^3$/h |
| Temperature | 50° C. |
| Concentration | acidulated water |
| Line 41 | |
| Acid | 1.0 m$^3$/h |
| Temperature | 50° C. |
| Concentration | acidulated water |
| Line 47 | |
| Acid | 300 kg/h |
| Temperature | 120° C. |
| Concentration | 77% by weight $H_2SO_4$ |
| Line 48 | |
| Acid | 715 kg/h |
| Temperature | 122° C. |
| Concentration | 78% by weight $H_2SO_4$ |
| Line 50 | |
| Acid | 606 kg/h |
| Temperature | 40° C. |
| Concentration | 92% by weight $H_2SO_4$ |
| Line 40 | 8.5 m$^3$/h |
| Water | |

| | |
|---|---|
| Line 42 | 1.0 m$^3$/h |
| Water | |
| Line 51 | 2.6 m$^3$/h |
| Water | |
| Line 16 | |
| The filtrate contains about 10 kg/h solids from the dust collector. | |

The advantages afforded by the invention reside in that the gases are dedusted to a very high degree without a temperature drop or with an only small temperature drop and a contamination and deterioration of the catalyst and a contamination of the sulfuric acid are avoided or highly decreased. As a result, the overall process is greatly improved in a simple and economical manner. Bulk catalysts may be used in trays.

What is claimed is:

1. In a process of purifying flue gases or other humid exhaust gases, which contain $NO_x$ and $SO_2$, wherein the $NO_x$ content is reduced and the $SO_2$ content is oxidized to $SO_3$ by a catalytic processing and the $SO_3$ content is subsequently condensed as sulfuric acid, the improvement comprising: subjecting the flue gases to a dedusting before the catalytic processing by scrubbing with sulfuric acid having a concentration of 70 to 90% by weight and a temperature of from 100° to 200° C. and adjusting the concentration and temperature of said sulfuric acid in dependence on the water content of the flue gases such that no water is transferred from the flue gases to said sulfuric acid and no or substantially no water is transferred from said sulfuric acid to the flue gases, and recirculating said sulfuric acid.

2. A process according to claim 1, wherein the scrubbing with said sulfuric acid is effected in a first stage in a concurrent operation by an injection into a venturi tube and is effected in a second stage in a counter-current operation in which said sulfuric acid is sprayed onto a bed of packing or onto a venturi plate in a tower.

3. A process according to claim 1, wherein a partial stream of said sulfuric acid is freed from solids and is subsequently recycled to the scrubber.

4. A process according to claim 1, wherein gas which has left the scrubber is heated in an indirect heat exchanger by catalyzed gas which has left the $SO_2$ oxidation stage to the operating temperature of the catalyst for the reduction of $NO_x$.

5. A process according to claim 1, wherein after the reduction of $NO_x$ the gas is heated to the operating temperature of the catalyst for the oxidation of $SO_2$.

6. A process according to claim 5, wherein the gas is heated by an indirect heat exchange to the operating temperature of the catalyst for the oxidation of $SO_2$.

7. A process according to claim 4, wherein the catalyzed gas which has been cooled in the indirect heat exchanger by the gas which has left the scrubber is cooled further in a second indirect heat exchanger to a temperature below the dew-point temperature of said sulfuric acid by the purified exhaust gas and is then fed to an $SO_3$ condenser, residual sulfuric acid vapor is absorbed by said sulfuric acid formed in the second indirect heat exchanger, the gas which has left the $SO_3$ condenser is scrubbed in a scrubber with an injected aqueous liquid and is thus cooled to 40° to 60° C., and the purified gas is heated in the second indirect heat exchanger to an entrance temperature for a chimney.

8. A process according to claim 7, wherein the concentration of said sulfuric acid in the SO₃ condenser is 60 to 90% by weight and its temperature is 90° to 140° C.

9. A process according to claim 1, wherein the catalytic processing of the flue gases is effected in horizontal contacting trays with bulk catalysts.

10. A process according to claim 7, wherein the purified gas is cooled to a temperature of 72° to 80° C. by an indirect heat exchange before entering the chimney.

11. A process according to claim 1, wherein said sulfuric acid contains sulfuric acid in a concentration of 82 to 88% by weight.

12. A process according to claim 1, wherein said sulfuric acid is at a temperature of from 130° to 180° C. as it enters the scrubber.

* * * * *